United States Patent
Chien

(10) Patent No.: US 10,557,501 B1
(45) Date of Patent: Feb. 11, 2020

(54) NONCONTACT FLUID BEARING AND MANUFACTURING METHOD THEREOF

(71) Applicant: METAL INDUSTRIES RESEARCH & DEVELOPMENT CENTRE, Kaohsiung (TW)

(72) Inventor: Kuo-Yu Chien, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 0 days.

(21) Appl. No.: 16/228,976

(22) Filed: Dec. 21, 2018

(51) Int. Cl.
| F16C 32/06 | (2006.01) |
| F16C 33/10 | (2006.01) |
| F16C 33/72 | (2006.01) |
| F16C 33/78 | (2006.01) |
| F16C 33/74 | (2006.01) |

(52) U.S. Cl.
CPC ...... F16C 32/0618 (2013.01); F16C 32/0644 (2013.01); F16C 32/0659 (2013.01); F16C 33/1045 (2013.01); F16C 33/743 (2013.01); F16C 33/7833 (2013.01)

(58) Field of Classification Search
CPC .............. F16C 32/0618; F16C 32/0685; F16C 33/743; F16C 33/784; F16C 33/6648; F16C 32/064; F16C 32/0644; F16C 33/1045; F16C 33/7833; F16C 32/0659; F16C 33/043
USPC .............. 384/94–95, 100, 113, 279, 119, 286
See application file for complete search history.

(56) References Cited

U.S. PATENT DOCUMENTS

| 2,683,635 A | * | 7/1954 | Wilcox | F16C 32/0618 384/109 |
| 2,898,164 A | * | 8/1959 | Patton | F16C 33/26 384/98 |
| 3,308,848 A | * | 3/1967 | Johnson | B64G 7/00 137/615 |
| 3,360,309 A | * | 12/1967 | Voorhies | F16C 32/0618 384/119 |

(Continued)

FOREIGN PATENT DOCUMENTS

| CN | 203730559 U | | 7/2014 | |
| JP | 57120602 A | * | 7/1982 | .............. B22F 7/002 |

(Continued)

OTHER PUBLICATIONS

Taiwanese Office Action dated Oct. 7, 2019 for Taiwanese Patent Application No. 107139970, 5 pages.

*Primary Examiner* — Marcus Charles
(74) *Attorney, Agent, or Firm* — Jackson IPG PLLC; Demian K. Jackson

(57) ABSTRACT

A noncontact fluid bearing is manufactured by disposing a flow controller in a cavity of a carrier to form a pressure chamber within the cavity. A sealing layer of the flow controller is located between a porous layer of the flow controller and the pressure chamber and has micro through holes communicating with the pressure chamber and pores of the porous layer. Because the sealing layer is located in the pressure chamber and a surface of the porous layer is exposed by a housing of the carrier, the noncontact fluid bearing can be processed from the exposed surface of the porous layer to conform standards of thickness and flatness. Furthermore, the sealing layer peeling from the noncontact fluid bearing is prevented.

15 Claims, 5 Drawing Sheets

(56) References Cited

U.S. PATENT DOCUMENTS

| | | | | |
|---|---|---|---|---|
| 3,407,013 | A * | 10/1968 | Weichsel | F16C 31/02 384/114 |
| 4,749,283 | A * | 6/1988 | Yokomatsu | F16C 29/025 384/12 |
| 4,838,710 | A * | 6/1989 | Ohta | C23C 14/32 384/100 |
| 5,587,796 | A * | 12/1996 | Rakitsch | B41F 33/0036 356/425 |
| 5,800,066 | A * | 9/1998 | Hayashi | F16C 32/0618 384/100 |
| 6,086,257 | A * | 7/2000 | Lee | F16C 33/10 384/129 |
| 6,276,145 | B1 * | 8/2001 | Sharpless | A61B 6/035 378/15 |
| 6,342,270 | B1 * | 1/2002 | Kumamoto | F16C 32/0618 427/289 |
| 6,342,306 | B1 * | 1/2002 | Ozawa | B22F 7/004 384/902 |
| 7,023,952 | B2 * | 4/2006 | Brunnett | A61B 6/035 378/15 |
| 8,753,014 | B2 * | 6/2014 | Devitt | F16C 32/0618 384/138 |
| 9,784,312 | B1 * | 10/2017 | Gu | F16C 32/0618 |
| 2009/0034887 | A1 * | 2/2009 | Fujikawa | F16C 32/0666 384/99 |
| 2015/0345552 | A1 * | 12/2015 | Chen | F16C 29/025 384/12 |

FOREIGN PATENT DOCUMENTS

| | | | | |
|---|---|---|---|---|
| JP | | 10169654 A | * 6/1998 | F16C 32/06 |
| SU | | 1244408 A | * 7/1986 | F16C 32/06 |
| SU | | 1712692 A2 | * 2/1992 | F16C 32/06 |
| WO | WO-0171207 A1 | | * 9/2001 | F16C 32/064 |

* cited by examiner

NONCONTACT FLUID BEARING AND MANUFACTURING METHOD THEREOF

FIELD OF THE INVENTION

This invention generally relates to a bearing and manufacturing method thereof, and more particularly to a noncontact fluid bearing and manufacturing method thereof.

BACKGROUND OF THE INVENTION

Referring to FIGS. 1 and 2, granted U.S. Pat. No. 6,342,270 B1 discloses a process for manufacturing a hydrostatic bearing 10 of porous material. A base member 1 is placed in a housing 3, a gel is applied on an exposed surface 11 of the base member 1, and baked thereon, thus forming a surface restrictor layer 2 sealing the exposed surface 11. Air is supplied into the housing 3 during grinding the surface restrictor layer 2 by using a grinding wheel in order to measure the flow rate of the air from the surface restrictor layer 2.

The surface restrictor layer 2 is pushed by the air flowing through the base member 1 so as to be separated from the base member 1 easily. Moreover, the surface restrictor layer 2 exposed by the housing 3 is grinded and the air is supplied into the housing 3 in the grinding process such that partial base member 1 and partial surface restrictor layer 2 may be removed by grinding if the surface restrictor layer 2 is distributed on the exposed surface 11 of the base member 1 unevenly. Consequently, the flow rate of the air permeating through the hydrostatic bearing 10 may be sufficient but not even.

On the other hand, it is not easy to control the thickness of the gel penetrating into the base member 1 during mass production of the hydrostatic bearings 10, for this reason, the surface restrictor layers 2 formed by baking the gel may have different thicknesses, and after grinding, the surface restrictor layers 2 on different base member 1 may cause the hydrostatic bearings 10 have different exhaust distributions. Pneumatic hammer may occur if the hydrostatic bearings 10 having different exhaust distributions are mounted on platform.

SUMMARY

One object of the present invention is to provide a noncontact fluid bearing able to prevent a sealing layer formed on a porous layer from peeling. The thickness and flatness of the noncontact fluid bearing or the porous layer can be adjusted to standard values by grinding a surface of the porous layer and the disadvantage of uneven exhaust caused by grinding the sealing layer in the prior art can be avoided.

The noncontact fluid bearing of the present invention comprises a carrier and a flow controller. The carrier includes a housing and a cavity recessed on the housing. The flow controller is placed in the cavity to form a pressure chamber within the cavity. A fluid feeding hole on the housing communicates with the pressure chamber. The flow controller includes a porous layer and a sealing layer formed on a first surface of the porous layer and located between the pressure chamber and the porous layer. The sealing layer has a plurality of micro through holes communicating with the pressure chamber and a plurality of pores of the porous layer. The housing exposes a second surface of the porous layer.

The sealing layer located between the pressure chamber and the porous layer can be pushed by a force of a fluid to stay on the first surface of the porous layer stably. And by grinding the second surface of the porous layer, where exposed by the housing, the thickness of the noncontact fluid bearing, the thickness of the flow controller or the flatness of the porous layer can be adjusted to a specified value.

DETAILED DESCRIPTION OF THE INVENTION

Figure 1:
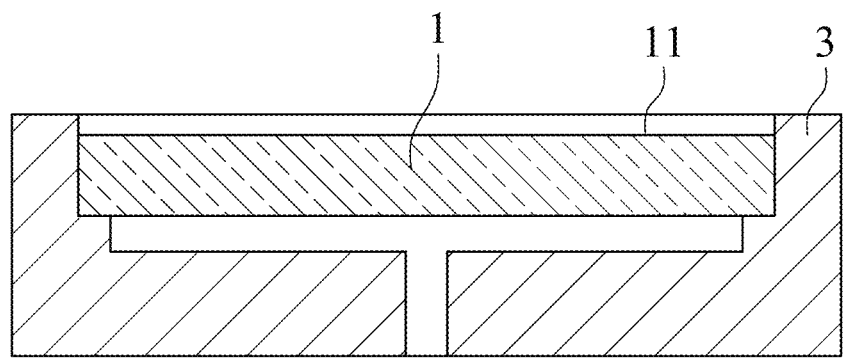
FIG. 1 is a cross-sectional diagram illustrating a hydrostatic bearing disclosed in U.S. Pat. No. 6,342,270 B1.
Figure 2:
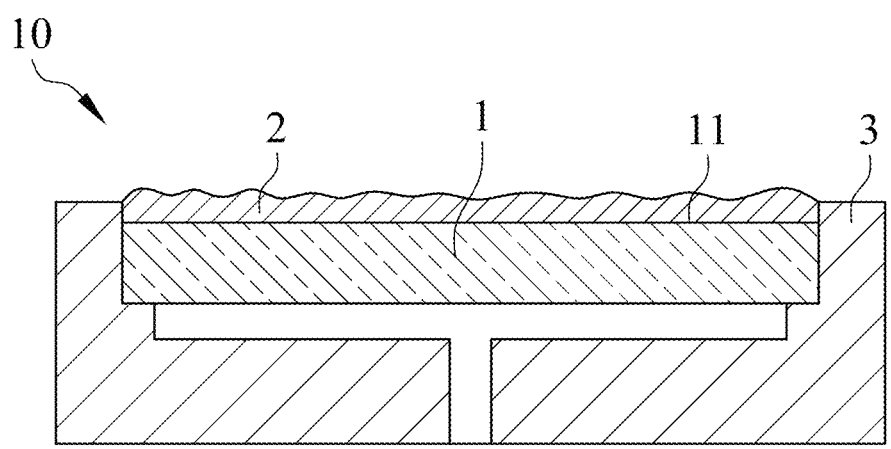
FIG. 2 is a cross-sectional diagram illustrating the hydrostatic bearing disclosed in U.S. Pat. No. 6,342,270 B1.
Figure 3:
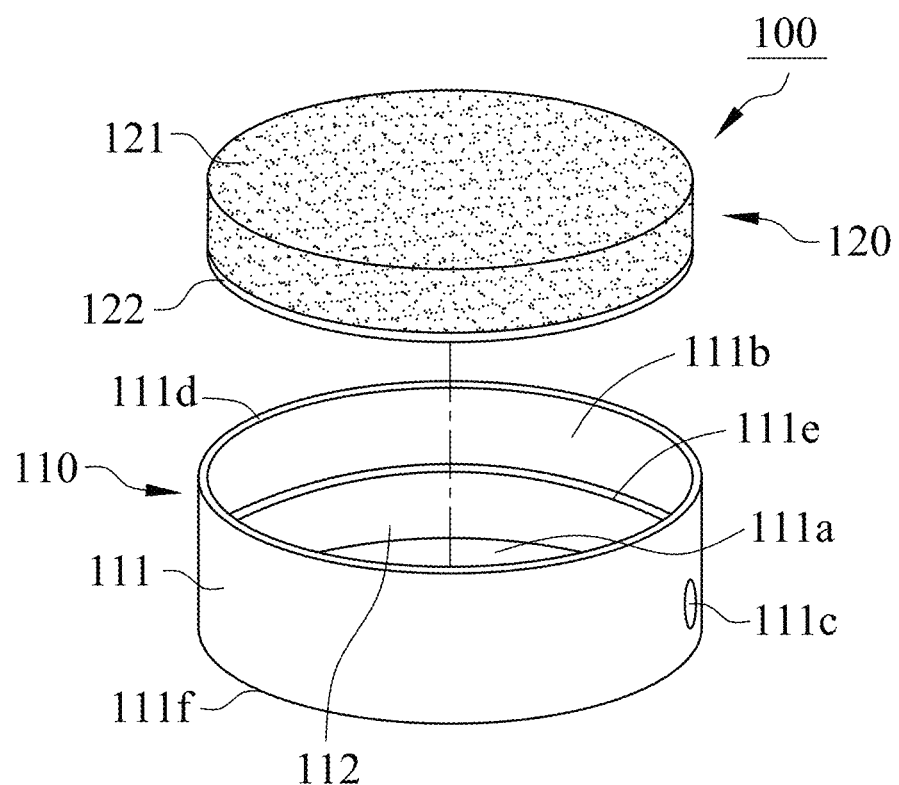
FIG. 3 is a perspective exploded diagram illustrating a noncontact fluid bearing in accordance with an embodiment of the present invention.
Figure 4:
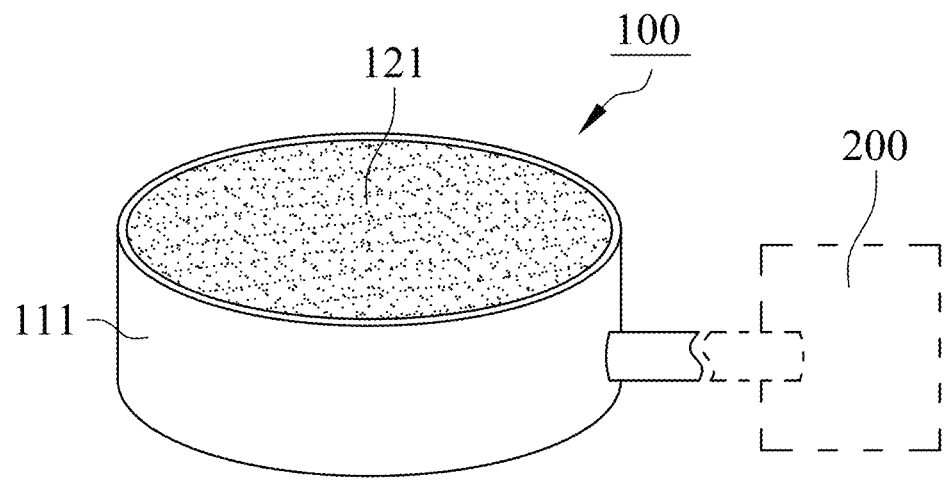
FIG. 4 is a perspective assembly diagram illustrating the noncontact fluid bearing in accordance with an embodiment of the present invention.

With reference to FIGS. 3 and 4, a noncontact fluid bearing 100 of the present invention includes a carrier 110 and a flow controller 120. The carrier 110 includes a housing 111 and a cavity 112, and the flow controller 120 is disposed in the cavity 112 of the carrier 110. A fluid can be supplied to the noncontact fluid bearing 100 via a fluid feeding hole 111c of the housing 111 by using a fluid supply apparatus 200. The fluid supply apparatus 200 is, but not limited to, a pump and the fluid can be gas or liquid.

Figure 5:
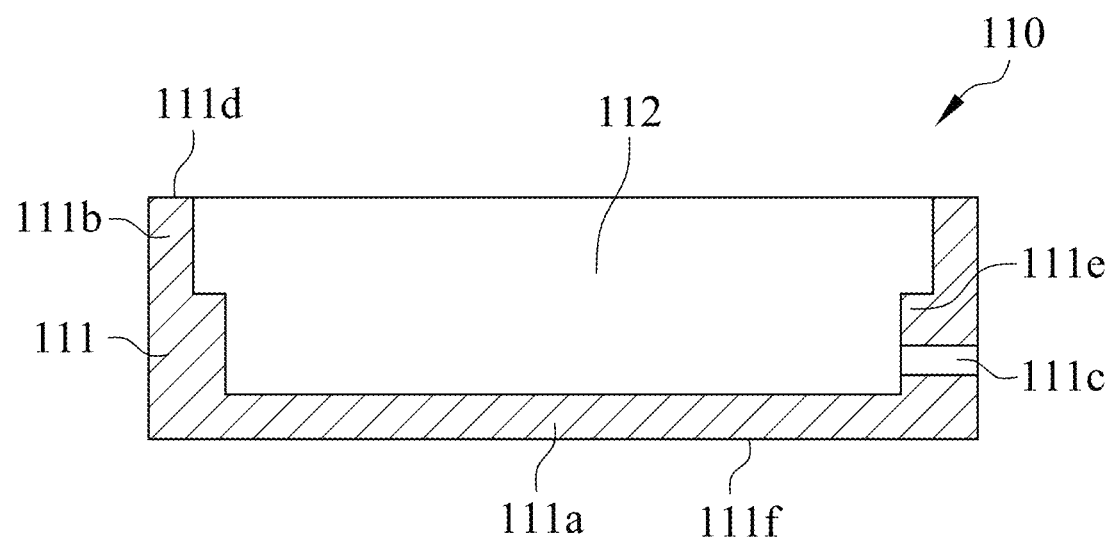
FIG. 5 is a cross-sectional diagram illustrating a carrier of the noncontact fluid bearing in accordance with an embodiment of the present invention.

FIGS. 5 to 8 show a manufacturing method of the noncontact fluid bearing 100. Referring to FIGS. 3 and 5 firstly, a carrier 110 having a housing 111 and a cavity 112 recessed on the housing 111 is provided. The housing 111 includes a bottom 111a, a circular wall 111b and a fluid feeding hole 111c communicating with the cavity 112.

Figure 6:
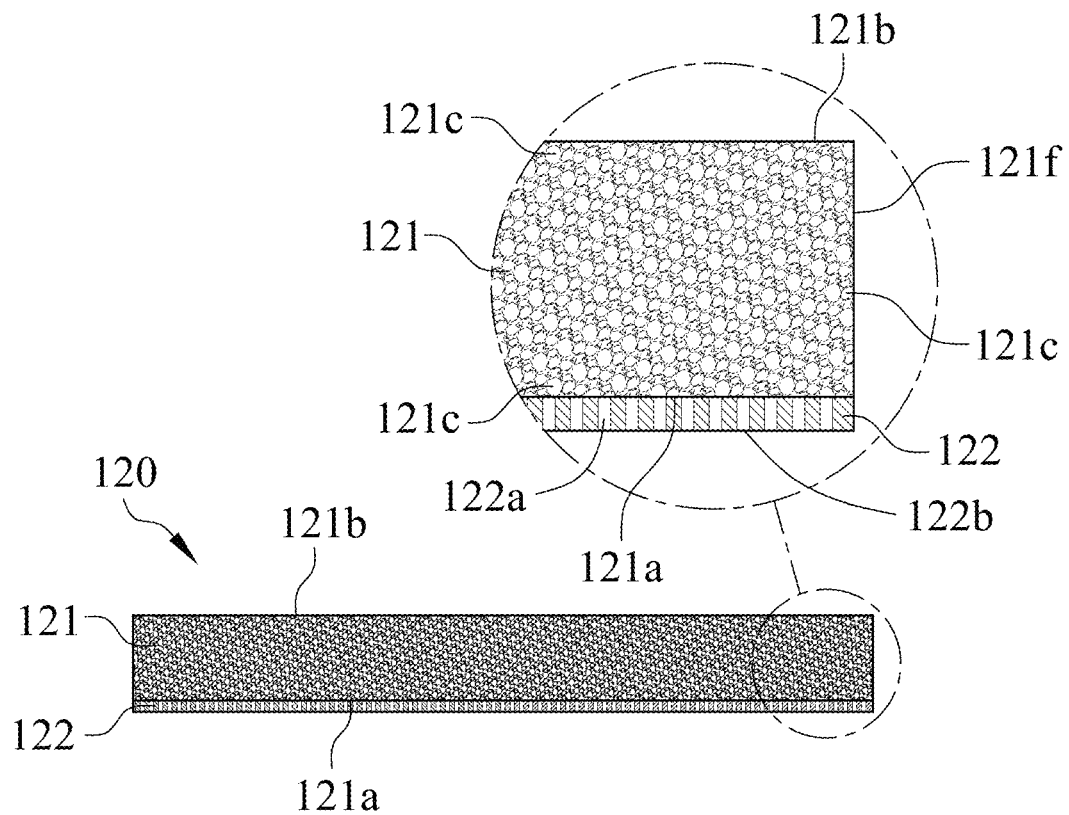
FIG. 6 is a cross-sectional diagram illustrating a flow controller of the noncontact fluid bearing in accordance with an embodiment of the present invention.

Next, referring to FIGS. 3 and 6, a flow controller 120 having a porous layer 121 and a sealing layer 122 is provided. The porous layer 121 has a plurality of pores 121c and may be made of metal (e.g. bronze), ceramic or graphite. The sealing layer 122 has a plurality of micro through holes 122a and may be made of a gas-impermeable material, such as gel, nonmetal or metal. The sealing layer 122 is formed on a first surface 121a of the porous layer 121 and the micro through holes 122a communicate with the pores 121c of the porous layer 121. Furthermore, the micro through holes 122a may be selectively arranged in particular region(s) of the sealing layer 122 and may have different cross-sectional shapes based on demands.

Figure 7:
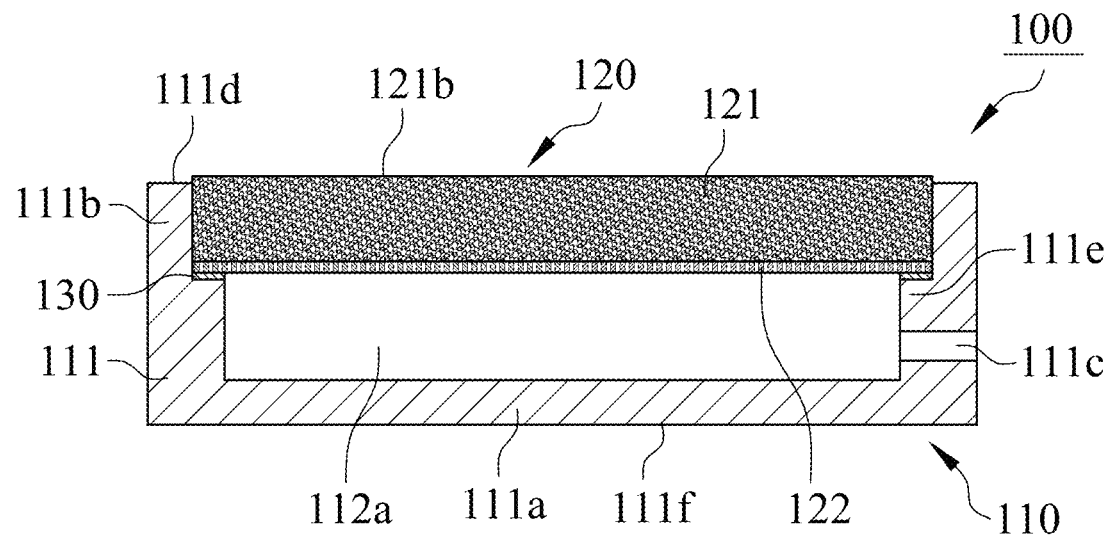
FIG. 7 is a cross-sectional diagram illustrating the noncontact fluid bearing in accordance with an embodiment of the present invention.

With reference to FIGS. 3 and 7, the flow controller 120 is placed in the cavity 112 and integrated with the housing 110. In this embodiment, a supporter 111e of the housing 111 is located in the cavity 112. The flow controller 120 is adhered to the housing 110 by an adhesive 130 which is applied between the sealing layer 122 and the supporter 111e. Preferably, the adhesive 130 is also applied between a lateral surface 121f of the porous layer 121 and the circular wall 111b for covering the pores 121c on the lateral surface 121f.

Figure 9:
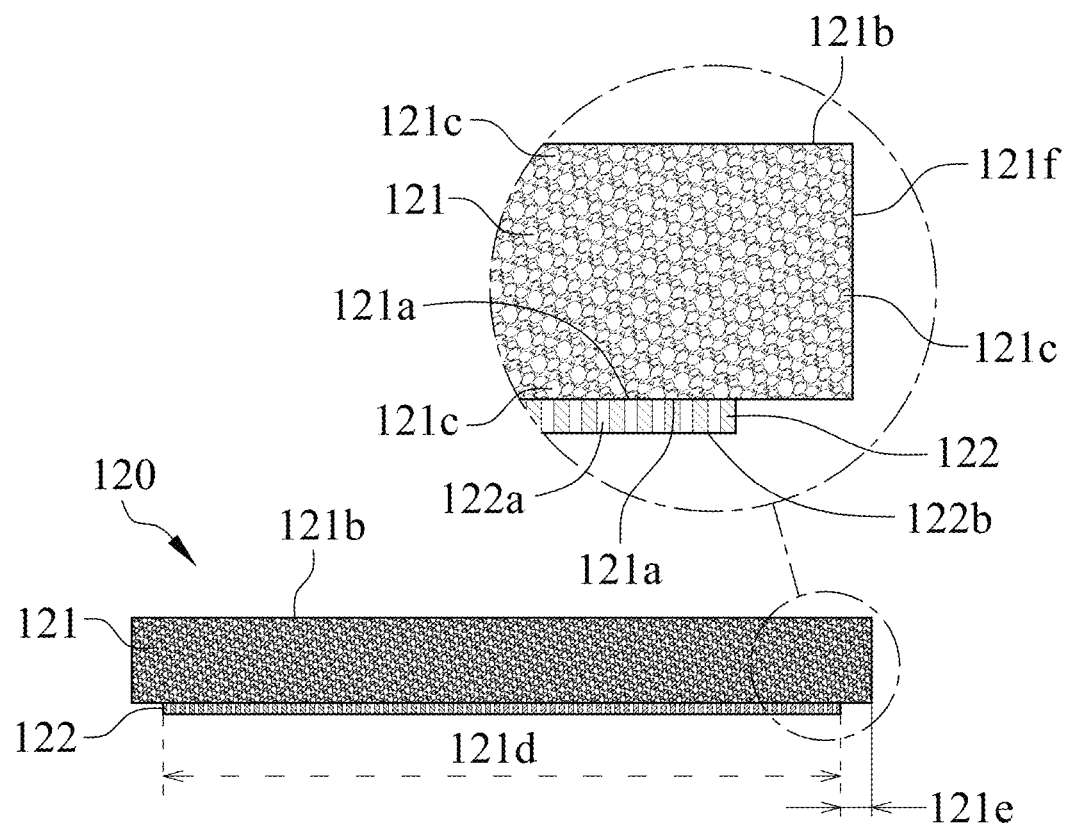
FIG. 9 is a cross-sectional diagram illustrating the flow controller of the noncontact fluid bearing in accordance with an embodiment of the present invention.
Figure 10:
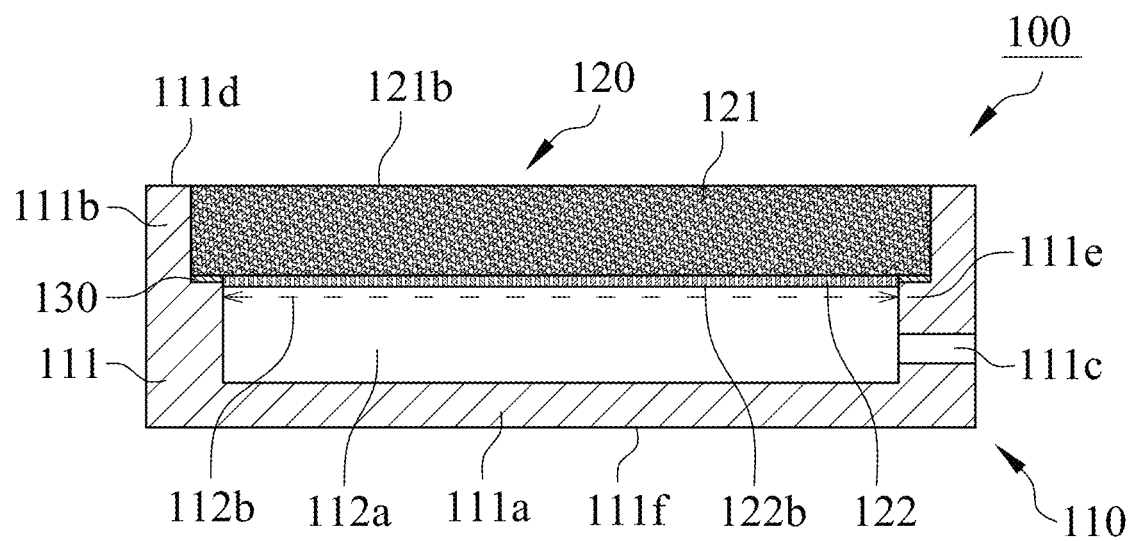
FIG. 10 is a cross-sectional diagram illustrating the noncontact fluid bearing in accordance with an embodiment of the present invention.

FIG. 9 represents a flow controller 120 of another embodiment different to that shown in FIG. 6. In this embodiment, a first region 121d and a second region 121e are defined on the first surface 121a of the porous layer 121, and the sealing layer 122 is formed on the first region 121d, not on the second region 121e, so the second region 121e is exposed. Referring to FIG. 10, the porous layer 121 in the second region 121e is connected to the housing 111. In this embodiment, the porous layer 121 in the second region 121e is connected to the supporter 111e of the housing 111. The adhesive 130 is preferably applied between the porous layer 121 in the second region 121e and the supporter 111e so as to adhere the flow controller 120 on the supporter 111e and cover the pores 121c on the second region 121e.

Figure 8:
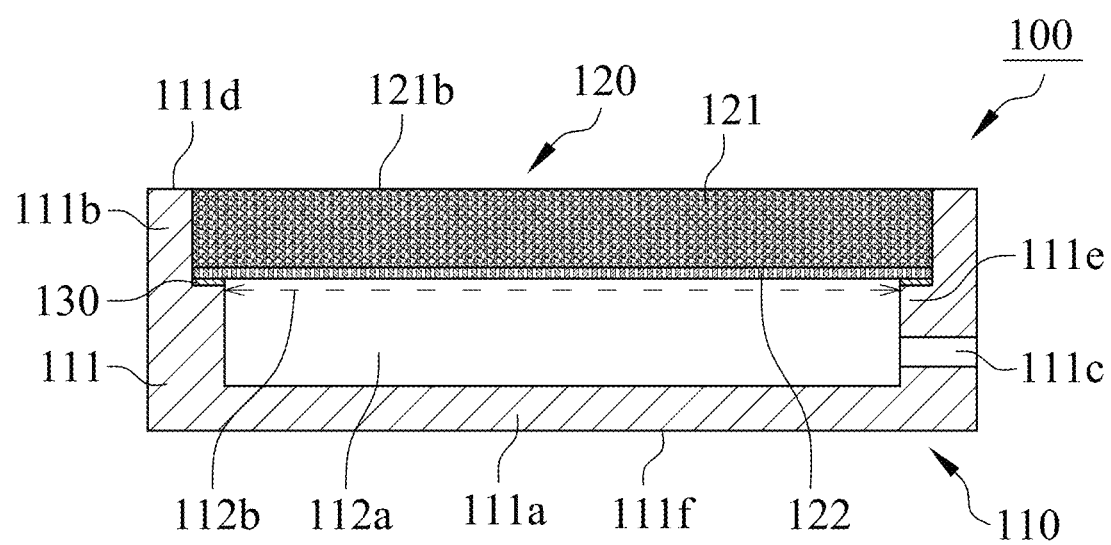
FIG. 8 is a cross-sectional diagram illustrating the noncontact fluid bearing in accordance with an embodiment of the present invention.

With reference to FIGS. 8 and 10, the sealing layer 122 is located between the bottom 111a of the housing 111 and the porous layer 121 such that a pressure chamber 112a is formed within the cavity 112. That is to say, the pressure chamber 112a is defined by the flow controller 120 and the housing 111 connected to each other. The fluid feeding hole 111c communicates with the pressure chamber 112a, and the micro through holes 122a communicate with the pressure chamber 112a and the pores 121c of the porous layer 121 such that a fluid (not shown) supplied via the fluid feeding hole 111c can sequentially flow through the pressure chamber 112a, the micro through holes 122a of the sealing layer 122 and the pores 121c of the porous layer 121.

With reference to FIGS. 4, 8 and 10, the sealing layer 122 formed on the first surface 121a of the porous layer 121 has an exposed surface 122b. When the flow controller 120 is placed in the cavity 112 to connect with the housing 111, the sealing layer 122 is located between the pressure chamber 112a and the porous layer 121 and the exposed surface 122b faces toward the bottom 111a of the housing 111. The sealing layer 122 is located in the pressure chamber 112a and the housing III exposes a second surface 121b of the porous layer 121. While a fluid is fed into the pressure chamber 112a via the fluid feeding hole 111c by a fluid apparatus 200, the sealing layer 122 is pushed by a force of the fluid to stay on the first surface 121a of the porous layer 121 stably without the possibility of peeling from the noncontact fluid bearing 100. Besides, the fluid in the pressure chamber 112a can pass through the micro through holes 122a to the porous layer 121 and pass through the pores 121c in the porous layer 121 to be exhausted to the outside of the noncontact fluid bearing 100. As a result, the volume of the fluid passing through the micro through holes 122a and the pores 121c can be controlled precisely to equalize the exhaust volume of the fluid from the noncontact fluid bearing 100. Referring to FIG. 10, the pressure chamber 112a preferably has a space opening 112b that has an area approximately equal to that of the exposed surface 122b.

With reference to FIGS. 7 and 8, if the thickness of the noncontact fluid bearing 100 or the flow controller 120 is too large, the porous layer 121 can be grinded by a grinding wheel (not shown) from the second surface 121b exposed by the housing 111 to the demanded thickness.

On the other hand, if the flow controller 120 placed in the cavity 112 improperly is crooked, the grinding wheel can be used to grind the porous layer 121 from the second surface 121b exposed by the housing 111 for flattening the second surface 121b. Referring to FIGS. 7 and 8, preferably, the second surface 121b of the porous layer 121 is preferably and substantially parallel to a mounting surface 111f of the bottom 111a and coplanar to a top surface 111d of the circular wall 111b.

When a fluid is supplying into the pressure chamber 112a, the sealing to layer 122 located between the pressure chamber 112a and the porous layer 121 is pushed by a force of the fluid to stay on the first surface 121a of the porous layer 121 steadily and not peel from the noncontact fluid bearing 100. Moreover, the thickness of the noncontact fluid bearing 100, the thickness of the flow controller 120 and the flatness of the porous layer 121 are adjustable to specified values by grinding the porous layer 121 from the second surface 121b exposed by the housing 111.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. A noncontact fluid bearing comprising:
   a carrier having a housing and a cavity recessed on the housing, the housing has a fluid feeding hole; and
   a flow controller disposed in the cavity to form a pressure chamber communicating with the fluid feeding hole within the cavity and including a porous layer and a sealing layer, the sealing layer is formed on a first surface of the porous layer and located between the pressure chamber and the porous layer, the sealing layer has a plurality of micro through holes communicating with the pressure chamber and a plurality of pores of the porous layer, a second surface of the porous layer is exposed by the housing.

2. The noncontact fluid bearing in accordance with claim 1, wherein a first region and a second region are defined on the first surface of the porous layer, the sealing layer is formed on the first region and exposes the second region, the porous layer is connected to the housing via the second region of the first surface.

3. The noncontact fluid bearing in accordance with claim 2, wherein the housing includes a supporter located in the cavity, and the porous layer is connected to the supporter via the second region of the first surface.

4. The noncontact fluid bearing in accordance with claim 3 further comprising an adhesive, wherein the adhesive is applied between the porous layer in the second region and the supporter and is provided to seal the pores in the second region, the flow controller is adhered to the supporter by the adhesive.

5. The noncontact fluid bearing in accordance with claim 1, wherein the sealing layer has an exposed surface facing toward a bottom of the housing, the pressure chamber has a space opening that has an area approximately equal to that of the exposed surface.

6. The noncontact fluid bearing in accordance with claim 1, wherein a bottom of the housing has a mounting surface parallel to the second surface of the porous layer substantially.

7. The noncontact fluid bearing in accordance with claim 1, wherein the second surface of the porous layer is coplanar to a top surface of a circular wall of the housing substantially.

8. A manufacturing method of noncontact fluid bearing comprising:
   providing a carrier having a housing and a cavity recessed on the housing, the housing has a fluid feeding hole;
   providing a flow controller including a porous layer and a sealing layer, the sealing layer is formed on a first surface of the porous layer and has a plurality of micro through holes communicating with a plurality of pores of the porous layer; and
   disposing the flow controller in the cavity to form a pressure chamber within the cavity, the sealing layer is located between the pressure chamber and the porous layer, the fluid feeding hole and the micro through holes communicate with the pressure chamber, a second surface of the porous layer is exposed by the housing.

9. The manufacturing method of noncontact fluid bearing in accordance with claim 8, wherein a first region and a second region are defined on the first surface of the porous layer, the sealing layer is formed on the first region and exposes the second region, the porous layer is connected to the housing via the second region of the first surface.

10. The manufacturing method of noncontact fluid bearing in accordance with claim 9, wherein the housing includes a supporter located in the cavity, and the porous layer is connected to the supporter via the second region of the first surface.

11. The manufacturing method of noncontact fluid bearing in accordance with claim 8, wherein the sealing layer has an exposed surface facing toward a bottom of the housing, the pressure chamber has a space opening that has an area approximately equal to that of the exposed surface.

12. The manufacturing method of noncontact fluid bearing in accordance with claim 11, wherein the porous layer is grinded from the second surface exposed by the housing after disposing the flow controller in the cavity of the carrier.

13. The manufacturing method of noncontact fluid bearing in accordance with claim 12, wherein the bottom of the housing has a mounting surface parallel to the second surface of the porous layer substantially.

14. The manufacturing method of noncontact fluid bearing in accordance with claim 12, wherein the second surface of the porous layer is coplanar to a top surface of a circular wall of the housing substantially.

15. A noncontact fluid bearing comprising:
   a housing having a fluid feeding hole; and
   a flow controller connected to the housing and including a porous layer and a sealing layer, a pressure chamber is defined between the flow controller and the housing, the sealing layer is formed on a surface of the porous layer and has a plurality of micro through holes, the fluid feeding hole communicates with the pressure chamber such that a fluid passing though the fluid feeding hole is able to sequentially pass through the pressure chamber, the micro through holes and a plurality of pores of the porous layer.

* * * * *